Patented May 8, 1951

2,552,025

UNITED STATES PATENT OFFICE 2,552,025

PHENOL-ALDEHYDE-AMINE CONDENSATION PRODUCTS

Eugene A. Barr, Jr., Bound Brook, N. J., assignor, by mesne assignments, to Union Carbide and Carbon Corporation, a corporation of New York No Drawing. Application January 8, 1946, Serial No. 639,903

4 Claims. (Cl. 154—43)

This invention relates to products obtained in the reaction of an aromatic amine, a phenol and formaldehyde. Reaction products of this type, employing aniline as the amine and of a reactive or heat-hardening nature for use in molding compositions, are described in a patent to Bender 1,955,731, April 24, 1934, and in other patents mentioned by Bender; in general the products so disclosed are made by reacting phenol with the reaction product of the amine and formaldehyde or (what amounts to the same procedure as Bender points out) by the simultaneous reaction of the phenol, the amine and formaldehyde. But characteristic of such products is that they have reactive functional groups, such as —CH$_2$OH, whereby they can be chained or heat-hardened as by reaction with hexamethylenetetramine to an infusible state, and under certain conditions they are decomposable.

It has now been found that non-heat-reactive products that do not so decompose to release the amine are obtainable from the reaction of a phenol, an aromatic amine and formaldehyde. These products have among other properties the remarkable and most useful one of internally plasticizing heat-reactive resins, such as the so-called one-step resins used as binders in making laminates, to the extent that binders containing them possess "hot-flexibility," i. e., they become yielding upon heating, and the heat-treated laminates made with them can be post-formed or drawn into shapes which upon cooling return to their former hard and strong condition with little effect on the cold flexibility (room temperature).

The present invention depends upon a controlled procedure that minimizes any substantial completion of the reaction taking place between the aromatic amine alone and the aldehyde prior to the completion of the reaction between the phenol, the amine and the aldehyde; as a result, the amine apparently hooks into the resin chain by way of a co-condensation polymerization with the splitting off of water. It has been found that the reaction can be most conveniently directed by mixing the phenol and the amine and holding until the temperature falls below that promoting the dehydration reaction between the amine and the aldehyde, and then gradually adding the aqueous formaldehyde to the mass; after the addition of the aldehyde (accompanied by some increase in temperature) heat is applied to raise the mass to refluxing temperature, and upon completion of the reaction the water is substantially removed by a vacuum dehydration. The amine can be first mixed with the formaldehyde provided in this case the temperature is not allowed to rise over about 60° C. before the phenolic compound is added.

Phenol, i. e., monohydroxybenzene (or its meta-substituted alkyl derivatives), is the preferred phenolic reactant, and it is also preferable to add enough of the formaldehyde to replace the hydrogens in the three particularly reactive positions on the ring, i. e., the two ortho and the para positions; the aldehyde is most conveniently aqueous formaldehyde (formalin) containing about 40 per cent formaldehyde in solution. Likewise it is preferred that the aromatic amino group be one having the formula ArNH$_2$, wherein Ar is a phenyl, o- or p-diphenyl, or o- or p-tolyl group. In general the same objective of reacting all free positions is sought with the use of other phenols of the monohydroxy type, such as the cresols and the xylenols.

The preferred reaction product so obtained from a phenol and sufficient molar proportions of formaldehyde and an aromatic amine to completely substitute the ortho and para reactive groups is believed to have the structure represented by the graphic formula

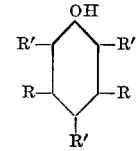

wherein R is either hydrogen or an alkyl group, and R' is an aromatic nitrogen-substituted methylene (—CH$_2$—NH—Ar). Such a product is permanently fusible, and with the three R''s substituted by the nitrogen-containing group it does not react with a hardening agent such as hexamethylenetetramine; it is quite stable when heated to temperatures as high as 200° C.; though in itself it is insoluble in water or alcohol, it reacts readily with a base-catalyzed phenolic resin to give alcohol-soluble products in which the nitrogen is in the resin chain; in concentrations of 20 to 40 per cent it is useful as an internal plasticizer for phenolic resins resulting with some decrease in hardening speed of the original resin, and in low concentrations of 5 to 10 per cent it acts as an agent for improving the flow to give fine craze-free surfaces to fast-setting resins.

It is as a plasticizer for heat-hardening resins that the product in its preferred form finds particular utility due to the fact that it reacts with the heat-hardening resin to function as an internal plasticizer for the resin. In laminates that are bonded with a heat-hardening resin varnish about 20 to 40 per cent of a plasticizer is normally included in the varnish to impart a degree of pliability for overcoming brittleness; but free plasticizing materials commonly used for the purpose objectionably weaken and reduce the rigidity of the sheet at room temperature if used in sufficient amount to impart the give necessary to the hot post-forming of laminates. Resins plasticized with phenol-aldehyde-amine products as herein disclosed, however, retain their rigidity, toughness, etc. at normal room temperature and become yielding and deformable while hot. That there is a reaction between the resin binder and the plasticizer is also evidenced by the fact that the plasticizer itself is soluble in acetone but the reacted binder in the finished laminate has a comparatively low acetone-extraction value, such as an acetone-extraction value of the ground hardened resin of less than 5 per cent of the weight of nitrogen-containing plasticizer added. Laminates made with an internally plasticized resin binder as herein described are in general characterized by the following properties:

| Properties | Paper Base | Fabric Base |
|---|---|---|
| Tensile strength_____p. s. i.. | 14,900 | 17,600 |
| Flexural strength (transverse)_____p. s. i.. | 23,800 | 24,000 |
| Compressive strength_____p. s. i.. | 47,200 | 41,700 |
| Moisture absorption_____percent.. | 0.75 | 1.0 |
| Dielectric strength_____volts/mil.. | 750 | 370 |
| Power factor at 1,000,000 cycles_____ | 0.030 | 0.044 |
| Dielectric constant at 1,000,000 cycles_____ | 4.04 | 3.54 |
| Dielectric loss factor at 1,000,000 cycles_____ | 0.12 | 0.14 |

The invention is illustrated by the following examples:

*Example 1*

Two moles of phenol (188 g.) and six moles (1014 g.) of o-aminodiphenyl are placed in a 3-necked 3-liter flask and mixed until the temperature falls to 40° C. Aqueous formaldehyde (6 moles; 486 g.) is then added gradually over a period of twenty minutes (temperature rise is about 25°). Heat is applied and the whole mass is refluxed for two hours at 105°–108° C. At the end of this period most all of the water (210 parts for every 100 parts of phenol) is removed by a vacuum dehydration (26″). The finishing temperature is between 95°–100° C., and the hot condensation product is easily removed from the still at this point. The reaction product is an amber colored solid which is brittle at 15° C. but becomes sticky at 30° C. and liquid at 80° C. and is non-heat-hardenable; it is soluble in acetone, ethyl-methyl-ketone, benzene, 25 per cent sodium hydroxide and concentrated sulfuric acid, but insoluble in water and ethyl alcohol.

*Example 2*

Two moles of phenol (188 g.) and six moles (558 g.) of aniline are placed in a 3-necked 3-liter flask and mixed until the temperature falls to 40° C. Aqueous formaldehyde (6 moles; 486 g.) is then added over a period of twenty minutes (temperature rise is about 15°). Heat is applied and the whole mass is refluxed for two hours at 99° C. At the end of this period, most all of the water (230 parts for every 100 parts of phenol) is removed by a vacuum dehydration (26″). The finishing temperature is between 94°–95° C, and the hot condensation product is easily removed from the still at this point. The product has substantially the properties characterizing the product of Example 1.

*Example 3*

The preparation of an internally plasticized varnish for use in making laminated sheet stock is the subject of this example. One hundred parts of phenol, 95.8 parts of formaldehyde and 1.21 parts of hexa are mixed and then refluxed for one hour at 100° C. Sixty parts of melted phenol-amine-formaldehyde condensation product (Example 1) are added at this point (temperature remaining between 80° and 100° C.) and after mixing and reacting for ten minutes the whole mass is dehydrated under 26″ of vacuum until the temperature again reaches 100° C. The temperature is then allowed to rise about two degrees per minute to a maximum of 120° C. to react to a desired viscosity; holding times varies from 5 to 10 minutes. The resin is cut in the usual way with 106.7 parts of alcohol to give an approximate sixty per cent solution. Other physical properties are approximately as follows: viscosity in cp. 460, gravity at 25° C. 1.0460 and set time in seconds, 2100.

*Example 4*

To make laminated sheet stock, 90 parts of the above varnish are diluted at 25° with 36 parts of alcohol; agitation is necessary during this addition, and the gravity of this solution is about 0.9700 at 22° C. This solution is used to impregnate eight ounce canvas duck to a 50 per cent resin content with the temperature and speed so regulated as to give a volatiles content of 2.8 to 3.3 (10 minutes at 160° C.).

A press load of four packs of four laminations (12 x 12″) each is cured under a pressure of 900 p. s. i. in the following way: Full steam is applied to the press until the temperature of the outside pack (as measured by a thermocouple) reaches 155° C. The steam pressure is then reduced to 75 pounds and the temperature is allowed to coast up to 161° C. (time—32 minutes). The thermocouple is then switched to the inside of the pack (which lags about 5° C.) and held until the inside reaches 161° C. (time—6 minutes). This temperature is held constant for 16 minutes for proper cure, when the whole load is cooled to 30° in 20 minutes.

Panels (63 mils thick) made in this way have an average hot-draw of 1⅞″ for a 3″ diameter cup. The laminated material can be bent to a 1/32″ radius, which is better than the normal of 1/16″ radius. When the thickness of this laminated is reduced to 53 mils or less, it can be bent to a zero radius, that is, 90°.

While Examples 1 and 2 are specific to two of the aromatic amines used in making the non-heat-hardening resin coming within the generic definition, other amines and any mixtures of them conforming to that definition can be subtituted in the same molar proportions to yield reaction products with a phenol and formaldehyde characterized by substantially the same properties. The proportions of reactants are those that provide substantial absence of any free reactive positions on the ring; and such a product is preferred when intended for use as an internal plasticizer, when the reaction is conducted in a manner to couple the amine within a phenolic resin chain.

What is claimed is:
1. Heat-hardenable composition comprising a heat-hardenable phenol formaldehyde resin in admixture with a dehydrated, permanently fusible condensation reaction product of a mono-hydroxy phenol having unsubstituted ortho and para positions, formaldehyde and an aromatic amine having the formula $ArNH_2$, wherein Ar is selected from the group consisting of phenyl, ortho-diphenyl, para-diphenyl, ortho-tolyl and para-tolyl, in the molar ratio of 1:3:3 respectively, said product being non-reactive with hexamethylenetetramine, soluble in acetone, and insoluble in water and alcohol.

2. Heat-hardenable composition comprising a heat-hardenable phenol formaldehyde resin in admixture with a dehydrated, permanently fusible, condensation reaction product of a mono-hydroxy phenol having unsubstituted ortho and para positions, formaldehyde, and ortho-aminodiphenyl, in the molar ratio of 1:3:3 respectively, said product being non-reactive with hexamethylenetetramine, soluble in acetone, and insoluble in water and alcohol.

3. Heat-hardenable composition comprising a heat-hardenable phenol formaldehyde resin in admixture with a dehydrated, permanently fusible, condensation reaction product of a mono-hydroxy phenol having unsubstituted ortho and para positions, formaldehyde, and aniline, in the molar ratio of 1:3:3 respectively, said product being non-reactive with hexamethylenetetramine, soluble in acetone, and insoluble in water and alcohol.

4. Laminated fibrous sheet stock having as a binder a phenol formaldehyde resin of the heat-hardening type internally plasticized with 20 to 40% by weight of a dehydrated, permanently fusible, condensation reaction product of a mono-hydroxy-phenol having unsubstituted ortho and para positions, formaldehyde and an aromatic amine having the formula $ArNH_2$, wherein Ar is selected from the group consisting of phenyl, ortho-diphenyl, para-diphenyl, ortho-tolyl and para-tolyl, in the molar ratio of 1:3:3 respectively, said product being non-reactive with hexamethylenetetramine and insoluble in water and alcohol.

EUGENE A. BARR, JR.

REFERENCES CITED

The following references are of record in the file of this patent:

UNITED STATES PATENTS

| Number | Name | Date |
| --- | --- | --- |
| 1,133,083 | Baekeland | Mar. 23, 1915 |
| 1,683,701 | Seebach | Sept. 11, 1928 |
| 1,994,753 | Cherry | Mar. 19, 1935 |
| 2,014,953 | Schlingman et al. | Sept. 17, 1935 |
| 2,321,783 | Webber | June 15, 1943 |
| 2,431,011 | Zimmer | Nov. 18, 1947 |
| 2,432,544 | Rhodes | Dec. 16, 1947 |

FOREIGN PATENTS

| Number | Country | Date |
| --- | --- | --- |
| 109,498 | Germany | Feb. 14, 1900 |

OTHER REFERENCES

Euler et al.: Chem. Abstracts, vol. 35, p. 5210.